United States Patent Office  
2,965,665  
Patented Dec. 20, 1960

2,965,665

PHOSPHONATES

Van R. Gaertner and Gail H. Birum, Dayton, Ohio, assignors to Monsanto Chemical Company, St. Louis, Mo., a corporation of Delaware No Drawing. Filed July 31, 1956, Ser. No. 601,105

18 Claims. (Cl. 260—461)

This invention relates to derivatives of phosphonoalkanesulfonic acids.

The compounds provided by the present invention may be represented generally by the formula

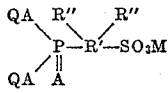

wherein Q is selected from the class consisting of ester-forming radicals and metallic cations as hereinbelow further defined, A is an atom of an element of group VIA having an atomic weight below 40, M is a metallic cation of groups 1 and 2 of the periodic table, R' is a hydrocarbon radical of from 3 to 7 carbon atoms, and R" is selected from the class consisting of hydrogen and hydrocarbon radicals free of aliphatic unsaturation and containing from 1 to 12 carbon atoms. By aliphatic unsaturation is here meant carbon-to-carbon, olefinic or acetylenic unsaturation.

We have made the surprising discovery that, when secondary esters of phosphite salts are reacted with sultones, there are formed valuable phosphonoalkanesulfonate ester salts of the formula

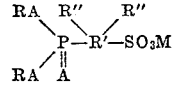

where R is an ester-forming radical, and R', R", A and M have the same significance as in the above formula.

The rearrangement of phosphite esters to phosphonate esters which is produced when a phosphite ester is reacted with an organic halide is known as the Michaelis-Arbuzov reaction. However, the literature of the art indicates that in previously studied reactions of phosphite esters with compounds containing sulfur, e.g., organic sulfonyl halides or sulfonate esters, either a rearrangement to a thiophosphate occurs (U.S. 2,690,450), or else the sulfonic acid group does not enter into the phosphorus-containing molecule (J. Amer. Chem. Soc. (1954), 76, 4172). Phosphonates containing a sulfonic group have not previously been reported to be available by a synthesis analogous to a Michaelis-Arbuzov reaction.

It has now surprisingly been found that the reaction of sultones with phosphite esters provides phosphonoalkanesulfonate compounds, in which both the phosphono,

and the sulfo

functional groups are present.

The reaction of tertiary phosphite esters with sultones is disclosed in copending application, now abandoned, Serial No. 513,583, filed June 6, 1955, assigned to the same assignee as the present disclosure. Whereas the aforesaid reaction of tertiary phosphite esters with alkanesultones is completed rapidly only at somewhat elevated temperatures, and yields neutral, water-insoluble tertiary esters of phosphonoalkanesulfonic acid compounds, we have discovered that secondary phosphite ester salts react with alkanesultones to give new and highly useful water-soluble phosphonoalkanesulfonic acid salts, and that this reaction goes readily at low temperatures, i.e., at room temperature or slightly above.

The present reaction of secondary phosphite ester salts with alkanesultones may be represented schematically as follows:

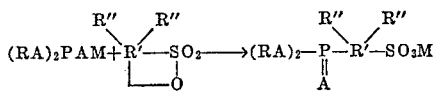

where R is an ester-forming radical, R' is a hydrocarbon radical of from 3 to 7 carbon atoms, R" is selected from the class consisting of hydrogen and hydrocarbon radicals free of non-benzenoid unsaturation and containing from 1 to 12 carbon atoms, A is a chalcogen element selected from the class consisting of oxygen and sulfur, and M is a metallic cation.

The sultones of the above formula and suitable for use in the present reaction may be prepared, e.g., by sulfochlorination of an organic halide, hydrolysis of the sulfonyl halide thereby formed, and ring-closure of the hydrolysis product with evolution of hydrogen halide. Sultones may be named as derivatives of the corresponding hydroxy sulfonic acids, i.e.:

CH₂—CH₂—CH₂—SO₂  
└————————O

Sultone of 3-hydroxy-1-propanesulfonic acid

The products of the sulfochlorination process of synthesizing sultones, as described above, are usually a mixture of isomers, e.g., starting from butyl chloride, there may be produced:

CH₃CHCH₂CH₂SO₂     CH₂CH₂CH₂CH₂SO₂  
└———————O          └———————O

Sultone of 3-hydroxy-     Sultone of 4-hydroxy-  
1-butanesulfonic acid      1-butanesulfonic acid

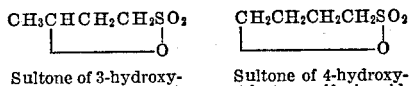

Sultone of 3-hydroxy-     Sultone of 3-hydroxy-  
2-methyl-1-propane-      1-methyl-1-propane-  
sulfonic acid             sulfonic acid etc. Sultones are alternatively described as alkanesultones. Specifying the hydrocarbon chain skeleton only, without reference to the points of attachment of the sulfur and oxygen atoms, sultones suitable for use in the present process may be described as propanesultone, butanesultone, kerosenesultone, etc. The term "butanesultone" then includes any one or more of the above isomeric sultones containing four carbon atoms.

Particularly preferred for use in the present process are sultones of the structure

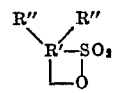

where R' is a hydrocarbon radical of from 3 to 7 carbon atoms, and R" is selected from the class consisting of hydrogen and hydrocarbon radicals free of aliphatic unsaturation and containing from 1 to 12 carbon atoms. As examples of such sultones may be listed, e.g., the sultone of 4-hydroxy-3,3-diphenyl-1-butanesulfonic acid, the sultone of 5-ethyl-5-hexyl-3-hydroxy-1-undecanesulfonic acid, the sultone of 4-hydroxy-2-phenyl-1-pentanesulfonic acid, the sultone of 4-hydroxy-1-methyl-1-hexanesulfonic acid, the sultone of 2-butyl-3-hydroxy-1-octanesulfonic acid, the sultone of 3-butyl-4-hydroxy-1-phenyl-1-butanesulfonic acid, the sultone of 4-hydroxy-4-(1-naphthyl)-1-butanesulfonic acid, etc. Other suitable sultones may be listed, for example, as propanesultone, butanesultone, hexanesultone, dodecanesultone, hexadecanesultone, etc.; such alkanesultones containing up to 31 carbon atoms form a preferred starting material in the present process.

The secondary phosphite ester salts which may be used in the present process are of the formula $(RO)_2POM$ where R is an ester-forming radical and M is a metallic ion. In the preferred embodiment of the present process, R is a radical containing from 1 to 14 carbon atoms and selected from hydrocarbon radicals and chloro-, cyano-, lower-alkoxy-, and carbo-lower-alkoxy-substituted hydrocarbon radicals, and M is a metallic ion of the 1st or 2nd groups of the periodic table. Secondary esters of phosphorous acid are readily prepared, e.g., by hydrolyzing tertiary phosphite esters, as described in Kosolapoff, "Organophosphorus Compounds," (New York, Wiley, 1950), page 188, using dilute acids or bases to catalyze the hydrolysis. While the free neutral secondary phosphite ester might be used in the present reaction, we prefer to convert the ester to a metallic salt and react the sultone with the phosphite ester salt of the above formula. The ester salts of phosphorous acid are readily prepared from the esters by known means, e.g., reaction of the metal and the ester in a suitable solvent such as ether, treatment of the ester in aqueous medium with ammoniacal silver nitrate, or hydrated cuprous oxide, etc.

The metallic ion of the above formula, which is a member of one of the first 2 groups of the periodic table, may be a light metal, such as sodium or potassium, calcium, strontium or barium, magnesium, or a heavy metal such as silver, zinc, or the copper (I) or mercury (I) ion. It will be obvious to those skilled in the art that when a divalent metal ion is employed in the present process, there is obtained a salt of 2 mols of the sulfonate with 1 mol of the metal, e.g.,

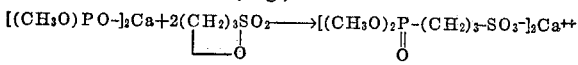

The calcium salt of 3-(dimethoxyphosphono)-1-propanesulfonic acid and it is intended that the present formulae as referring to divalent metal salts should be so understood. The ester-forming radical in the present phosphite ester salts may be a hydrocarbon radical, or may be any substituted hydrocarbon radical of up to 14 carbon atoms in which the substituent does not interfere with the course of the present reaction.

Examples of dialkyl phosphite salts useful in the present process are sodium diethyl phosphite, potassium diethyl phosphite, silver ethyl propyl phosphite, the calcium salt of diethyl phosphite, sodium di-n-butyl phosphite, cuprous n-butyl n-hexyl phosphite, the magnesium salt of dihexyl phosphite, sodium dihexyl phosphite, sodium dioctyl phosphite, sodium octyl isobutyl phosphite, potassium di-sec-butyl phosphite, cuprous di-sec-amyl phosphite, etc. Alkenyl phosphites such as sodium di-5-hexenyl phosphite, sodium diisopropenyl phosphite, cuprous di-3-cyclopentenyl phosphite, etc., may also be used in this process.

Another class of secondary hydrocarbon ester salts of phosphorous acid which may be reacted with sultones in accordance with the present invention, comprises esters containing ring-systems, i.e., aryl esters such as sodium diphenyl phosphite, aralkyl esters such as potassium dibenzyl phosphite, mercurous benzyl diphenylmethyl phosphite and sodium bis(p-tolylmethyl) phosphite, cycloalkyl esters such as the zinc salt of dicyclohexyl phosphite, and cyclic glycol esters such as the strontium salt of propylene phosphite, lithium 2-ethylpropylene phosphite, etc.

Substituted secondary ester salts of phosphorous acid which may be used in the process of this invention include, e.g., ether esters such as sodium bis(2-ethoxyethyl) phosphite, sodium bis[2-(2-ethoxy-ethoxyethyl] phosphite, sodium 2-butoxypropyl 2-butoxyethyl phosphite, the magnesium salt of bis(4-methoxymethylbutyl) phosphite, silver bis(1,3-di-o-toloxy-2-propyl) phosphite, mercurous methoxyphenyl phenethyl phosphite, etc. Also included are halogen-substituted esters such as sodium bis(2-chloroethyl) phosphite, potassium bis(2,2-dichloropropyl) phosphite, silver 4-chlorobutyl bromobutyl phosphite, cuprous bis(p-chlorophenyl) phosphite, sodium bis[2-(2-chloroethoxy)ethyl] phosphite, sodium bis(2,4,5-trichlorobenzyl) phosphite, lithium bis(2-chloroethyl) phosphite, the calcium salt of bis(1-chloroethyl) phosphite, etc. Another substituent which may be present in the ester radical is, e.g., the cyano radical, i.e., esters such as sodium bis(2-cyanoethyl) phosphite, cuprous bis(3-cyanopropyl) phosphite, silver 4-cyanobutyl ethyl phosphite, etc., may be used. Another class of substituted phosphite esters useful in the present process includes carbalkoxy-substituted esters, i.e., sodium bis(2-carbethoxyethyl) phosphite, silver 1-carbomethoxypropyl isopropyl phosphite, potassium bis(α-carbethoxy-p-tolyl) phosphite, etc. Whereas the above listings of secondary phosphite ester salts have included the esters of phosphorous acid, the ester salts of the thiophosphorous acids are also included in the scope of the present invention. These may be prepared, e.g., by reacting $P_2S_3$ with alcohols or mercaptans, giving secondary esters of thionophosphorous acid, which may further be converted to the salts of these acids. Thio-phosphite ester salts useful in the present process include, for example, sodium diethyl phosphorothioite, sodium diethyl phosphorodithioite, potassium di-n-butyl phosphorothioite, cuprous benzyl phenyl phosphorothioite, silver diisohexyl phosphorothioite, etc.

In the present process, alkanesultones are reacted with secondary phosphite ester metal salts to form metal salts of secondary esters of phosphonoalkanesulfonates of the formula

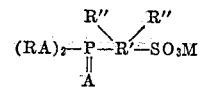

where R, R′, R″, A and M have the significance described hereinabove. In a preferred embodiment of the present reaction, there are obtained by the reaction of dialkyl phosphite salts with alkanesultones such compounds as sodium 3-(dimethoxyphosphono)-1-propanesulfonate, potassium 3-(diethoxyphosphono)-1-propanesulfonate, sodium 3-(di-n-butoxyphosphono)-1-propanesulfonate, silver 3-(diethoxyphosphono)-1-butanesulfonate, cuprous 4-(di-3-n-butenoxyphosphono)-1-butanesulfonate, the calcium salt of 4-(diisopropoxyphosphono)-1-pentanesulfonate, sodium 4-(di-n-butoxyphosphono)-2-phenyl-1-butanesulfonate, cuprous 4-(O-ethoxy-O′-isopropoxyphosphono)-1-pentanesulfonate, mercurous 3-[bis(2-ethylhexoxy)phosphono]-1-propanesulfonate, potassium 4-[bis(2-butyl-octoxy)phosphono]-1-butanesulfonate, etc.

By the reaction of phosphite ester salts containing a ring system with alkanesultones, there are prepared in accordance with the present method such compounds as sodium 3-(diphenoxyphosphono)-1-propanesulfonate, lithium 4-(di-o-toloxyphosphono)-2-methyl-1-butanesulfonate, silver 5-(di-p-toloxyphosphono)-1-hexadecanesulfonate, the strontium salt of 4-(di-1-naphthoxyphosphono)-5-(4-heptenyl)-1-dodecanesulfonate, the magnesium salt of 4-(O-cyclohexoxy-O′-p-toloxyphosphono)-1-hexanesulfonate, the barium salt of 4-(1,3-propylenedioxyphosphono)-1-butanesulfonate, cuprous 2,3-diphenyl-4-(di-p-toloxyphosphono)-1-butanesulfonate, etc.

Reaction of a substituted phosphite ester salt with an alkanesultone by the present process may give, e.g., sodium 3-[bis(2-chloroethoxy)phosphono]-1-propanesulfonate, sodium 3-[bis(3-cyanopropoxy)phosphono]-1-propanesulfonate, sodium 3-(bis[2-n-butoxy)ethoxy]phosphono)-1-butanesulfonate, cuprous 3-[bis(2-carbethoxy)phosphono]-1-propanesulfonate, the calcium salt of 4-[bis(2 - methoxymethoxyethoxy)phosphono] - 1 - dodecanesulfonate, the magnesium salt of 3-(diphenethyloxyphosphono)-2,2-diphenyl-1-propanesulfonate, potassium 4 - [O - (2 - methoxyethoxy) - O' - (1 - methoxyethoxy) phosphono]-1-pentanesulfonate, etc.

Alkanesultones reacted with ester salts of thiophosphorous acids give such compounds as potassium 3-(O,O'-diethoxythiophosphono)-1-propanesulfonate, sodium 4-(O,S-dibutyldithiophosphono)-1-butanesulfonate, the zinc salt of 5-(O,S-diphenyldithiophosphono)-1,3-dimethyl-1-pentanesulfonate, etc.

To prepare the present compounds, the secondary ester phosphite salt is simply contacted with the alkanesultone. The length of time required by the reaction depends on the particular alkanesultone and phosphite ester salt reacted, as well as on the reaction temperature, solvents, etc. We have found that the alkanesultone and phosphite ester salt react spontaneously at room temperature, though, if desired, gentle heating, i.e., at about 50 to 150° C., may be applied to accelerate the reaction. Although the reaction goes readily at ordinary atmospheric pressures, super- or subatmospheric pressures may be applied if desired. We prefer to carry out the present reaction in the presence of solvents and diluents, to facilitate contacting the reactants, but such solvents may be omitted at will, provided the reactants are otherwise sufficiently well contacted, i.e., by melting, stirring, etc. Suitable solvents for the reaction comprise any fairly low-boiling organic liquids, which may be aromatic, such as benzene, toluene, etc.; aliphatic, such as hexane, pentane, etc.; cycloaliphatic, such as cyclohexane; oxygen-containing, such as ethanol, dioxane, or 1-ethoxy-2-propanol, etc. Conveniently, equimolecular amounts of the two reactants, the phosphite ester salt and the alkanesulfonate, may be used in the reaction; if desired, however, an excess of the more readily available component may be used, i.e., so as to utilize the less readily available component more completely; and the excess, unreacted material may then be removed when reaction is complete, i.e., by extraction, distillation, etc.

The present ester salts of phosphonoalkanesulfonic acids are generally solid compounds, characterized by high surface-activity, and useful for a variety of chemical and agricultural purposes. They are useful, among other things, as chemical intermediates; for example, by saponification, the present esters may be converted into phosphonoalkanesulfonate salts, of the formula

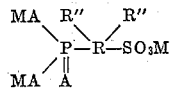

where M is a metallic cation of one of the first 2 groups of the periodic table, A is an atom of an element of group VIA having an atomic weight below 40, R' is a hydrocarbon radical of from 3 to 7 carbon atoms, and R" is selected from the class consisting of hydrogen and hydrocarbon radicals free of aliphatic unsaturation and containing from 1 to 12 carbon atoms. In a preferred embodiment of the present invention, A in the above formula is oxygen, and M is a light metal, i.e., an alkali or alkaline earth metal. Salts of the above formula may be readily prepared by standard saponification techniques, e.g., by heating the present phosphonoalkanesulfonate ester salts with an aqueous solution of a base, i.e., an alkali or alkaline earth metal hydroxide such as sodium hydroxide, and then adding a neutral salt, such as sodium chloride, to this mixture to produce separation of the phosphonoalkanesulfonate salt. Alternative procedures, such as hydrolysis of the present phosphonoalkanesulfonate ester salts to the free acids, followed by formation of the salts, may be employed if desired.

Salts of phosphonoalkanesulfonic acids of the above formula which may be prepared as described above include, e.g., trisodium 3-phosphono-1-propanesulfonate, tripotassium 3 - phosphono-1-butanesulfonate, disodium potassium 4-phosphono-1-butanesulfonate, calcium sodium 3-phosphono-1-propanesulfonate, disodium lithium 3-phosphono-1-dodecanesulfonate, trisodium 5-phosphono-2-hexadecanesulfonate, etc.

The tertiary salts of phosphonoalkanesulfonic acids which may be prepared as described immediately above are generally solid hygroscopic materials, which are characterized by high water-solubility and surface-activity.

The salt and ester salt products of this invention are surface-active agents. The ester salts of phosphonoalkanesulfonic acids are soluble in water and in organic solvents, and are useful, for example, as detergent additives in lubricating oils; that is, they may be added to a lubricating oil, e.g., a mineral oil having an S.U.S. viscosity of 40 at 210° F., in an additive amount, i.e., less than 10% and generally about 0.2% by weight, to inhibit the deposition therefrom of sludge, caused by oxidation, engine wear, etc.

Furthermore, the ester salts of the invention wherein the phosphonic acid radical is esterified with radicals containing from 8 to 14 carbon atoms form stable foams in aqueous solution. At concentrations of about 1% or below, these esters may be employed in water solution to produce foams for purposes such as the blanketing of electroplating baths, the flotation of ores, etc. For example, by suspending a finely divided zinc-bearing ore in an aqueous solution containing 1% or less of one of the present phosphonoalkanesulfonic acid $C_{8-14}$-diester salts and frothing the solution by blowing air therethrough, the zinc values may be collected in the surface foam and separated from the gangue.

The tertiary salts and ester salts of this invention may also be employed as surface-active agents in washing compositions. For example, the present tertiary salts may be employed as builders in amounts up to 30% by weight to enhance the washing power of detergent compositions containing, e.g., a detergent such as a dodecylbenzenesulfonate or ethylene oxide condensate with dodecanol. The present ester salts having foaming properties as described above may be employed as foam-producing agents in detergent compositions containing non-foaming detergents such as dodecanol-ethylene oxide condensates, to produce household washing agents wherein visual foaming is a desirable property. Other applications of the surface-active properties of the present compounds are, e.g., their uses as wetting agents or detergents in the textile, petroleum or paper industries, for example, to decrease the pulping cycle in sulfite, sulfate, and semi-chemical processes in the paper industry; to serve as a wetting agent in water flooding operations in the petroleum industry, etc.

Additionally, the present salts and ester salts are biological toxicants. For example, the compounds of the invention wherein the esterifying radical R of the formulae shown above contains from 1 to 7 carbon atoms may be employed as insecticides, at concentrations of 0.001% to 1.0% and above, as a contact or as a stomach poison, to combat *Aëdes aegypti, Tetranychus telarius, Prodenia eridania, Tribolium castaneum*, etc. These esters may, for example, be added to aqueous habitats of mosquito larvae as a toxicant therefor.

The invention is further illustrated, but not limited, by the following examples:

*Example 1*

To 200 ml. of dry toluene containing 4.6 grams (0.20 mole) of sodium were added gradually 39 grams (0.20 mole) of dibutyl phosphite, while the mixture was maintained at 100–110° C. Evolution of hydrogen was rapid. The sodium and dibutyl phosphite were refluxed together for another hour, after which the solution was cooled with protection against access of moisture. A 100-ml. portion of the supernatant toluene solution of sodium dibutyl phosphite was then withdrawn and transferred to a flask.

γ-Propanesultone, 12.2 grams in 10 ml. of benzene, was added rapidly to the 200 ml. of toluene solution prepared as described above, and washed in with an additional 10 ml. of benzene. The temperature of the mixture rose spontaneously to 65° C.; after the mixture had been held at 70° F. for a half hour, the formerly yellow solution was observed to have become clear. Removal of toluene and benzene by application of a low vacuum left a thick, viscous residue, soluble in ether, alcohol and water. This viscous residue was washed four times with 25-ml. portions of hexane, leaving 31.7 grams of thick, gummy sodium 3-(dibutoxyphosphono)-1-propanesulfonate, of which a sample was dried at 144° C./0.1 mm., and analyzed as follows:

|  | Found | Calculated for $C_{11}H_{24}NaO_6PS$ |
| --- | --- | --- |
| Percent C | 36.21 | 39.0 |
| Percent H | 7.20 | 7.15 |

Sodium 3-(dibutoxyphosphono)-1-propanesulfonate is toxic to yellow fever mosquito (*Aëdes aegypti*) 3rd and 4th instar larvae when introduced at a concentration of 10 parts per million into an aqueous suspension of said larvae.

Example 2

A mixture of 84 grams (0.20 mole) of bis(2-butyloctyl) phosphite in 201.5 grams of toluene with 5.1 grams (0.22 mole) of sodium was refluxed for three and a half hours, after which time substantially all the sodium had dissolved. The toluene solution was filtered from residual solids and cooled. A 145-gram portion of this solution was placed in a flask, at room temperature, and 12.2 grams of γ-propanesultone in 10 ml. of benzene was added to it, whereupon spontaneous evolution of heat caused the temperature of the reaction mixture to rise to 47° C. The solution was left standing for 2⅓ days, refluxed for 30 minutes, and then solvent was removed by aspiration, and ethanol added. The resulting mixture formed a gel, which was cooled, diluted with acetone, and filtered. The precipitate was dried under vacuum at 65° C., yielding 20.5 grams of a foamy product containing the desired sodium 3-[bis-(2-butyloctoxy)phosphono]-1-propanesulfonate.

The foaming properties of sodium 3-[bis(2-butyloctoxy)-phosphono]-1-propanesulfonate were evaluated by the Ross-Miles lather test, which is described in Oil and Soap, vol. 18, pp. 93–102 (1941). The solution of 0.10% of the ester salt in distilled water was held at 56° F. for 30 minutes prior to the test. The lather height was found to be 6.4 cm. initially, and 5.5 cm. after 5 min., which indicates very good foam stability.

Using procedures similar to those described in Examples 1 and 2, from sodium bis(2-ethylhexyl)phosphite and butanesultone, there may be prepared sodium 4-[bis(2-ethylhexoxy)phosphono] - 1 - butanesulfonate; diethyl phosphite and hexadecanesultone may be reacted to give sodium 4-(diethoxyphosphono)-1-hexadecanesulfonate, etc.

Example 3

A mixture of 17 g. of sodium 3-(dibutoxyphosphono)-1-propanesulfonate in 20 ml. of ethanol is heated with 200 ml. of a 40 percent by weight aqueous solution of sodium hydroxide for an hour; to the solution is added 50 g. of sodium chloride. After decanting and filtering to remove solvents, the trisodium salt of 3-phosphono-1-propanesulfonic acid is recovered.

While the present invention has been described above with particular reference to individual compounds and detailed procedures, it is to be understood that other modifications and variations may be used without departing from the scope of the invention.

The present application is a continuation-in-part of copending application, now abandoned, Serial No. 513,582, filed June 6, 1955.

What is claimed is:

1. A compound selected from the class consisting of compounds of the formulas

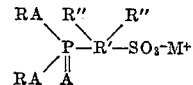

and

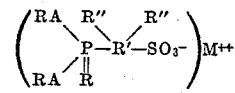

and saponification products thereof forming the corresponding salt of metallic cations of groups I and II of the periodic table, wherein R is a hydrocarbon radical of up to 14 carbon atoms, A is an atom of an element of group VI having an atomic weight below 40, M is a metallic cation of groups I and II of the periodic table, R′ is an alkylene radical of from 3 to 7 carbon atoms, and R″ is selected from the class consisting of hydrogen and hydrocarbon radicals free of aliphatic unsaturation and containing from 1 to 12 carbon atoms.

2. A compound selected from the class consisting of compounds of the formulas

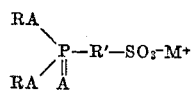

and

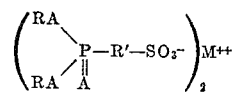

wherein R is a hydrocarbon radical of up to 14 carbon atoms, R′ is an alkylene radical of from 3 to 7 carbon atoms, A is an atom of an element of group VI having an atomic weight below 40 and M is a metallic cation of groups I and II of the periodic table.

3. A compound selected from the class consisting of compounds of the formulas

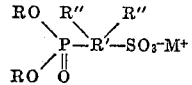

and

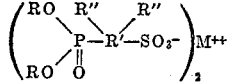

wherein R is a hydrocarbon radical of up to 14 carbon atoms, R′ is an alkylene radical of from 3 to 7 carbon atoms, R″ is selected from the class consisting of hydrogen and hydrocarbon radicals free of aliphatic unsaturation and containing from 1 to 12 carbon atoms, and M is a metallic cation of groups I and II of the periodic table.

4. A compound selected from the class consisting of compounds of the formulas

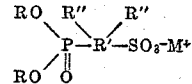

and

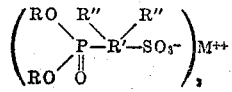

wherein R is a hydrocarbon radical of up to 14 carbon atoms, R' is an alkylene radical of from 3 to 7 carbon atoms, R" is selected from the class consisting of hydrogen and hydrocarbon radicals free of aliphatic unsaturation and containing from 1 to 12 carbon atoms, and M is a metallic cation selected from the class consisting of alkali metals and alkaline earth metals.

5. A dialkoxyphosphonoalkanesulfonate salt selected from the class consisting of compounds of the formulas

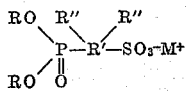

and

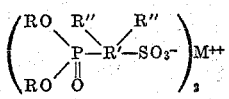

wherein R is an alkyl radical of up to 14 carbon atoms, R' is an alkylene radical of from 3 to 7 carbon atoms, R" is selected from the class consisting of hydrogen and hydrocarbon radicals free of aliphatic unsaturation and containing from 1 to 12 carbon atoms, and M is a metallic cation selected from the class consisting of alkali metals and alkaline earth metals.

6. A phosphonoalkanesulfonate salt of the formula

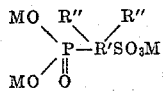

wherein M is a metallic cation of group I of the periodic table, R' is an alkylene radical of from 3 to 7 carbon atoms, and R" is selected from the class consisting of hydrogen and hydrocarbon radicals free of aliphatic unsaturation and containing from 1 to 12 carbon atoms.

7. An alkaline earth metal saponification product of a compound selected from the class consisting of compounds of the formulas

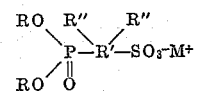

and

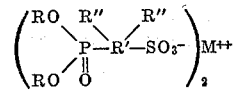

wherein R' is an alkylene radical of from 3 to 7 carbon atoms, R" is selected from the class consisting of hydrogen and hydrocarbon radicals free of aliphatic unsaturation and containing from 1 to 12 carbon atoms.

8. Sodium 3-(dibutoxyphosphono)-1-propanesulfonate.

9. Sodium 3-[bis(2-butyloctoxy)phosphono]-1-propanesulfonate.

10. A compound having the formula

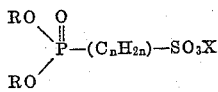

where R is an alkyl group of four to twelve carbon atoms, $n$ is an integer of three to four, and X is an alkali metal.

11. The process which comprises reacting an alkanesultone of the formula

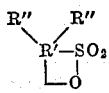

wherein R' is an alkylene radical of from 3 to 7 carbon atoms, and R" is selected from the class consisting of hydrogen and hydrocarbon radicals free of aliphatic unsaturation and containing from 1 to 12 carbon atoms, with a secondary ester of a phosphite salt selected from the class consisting of compounds of the following formulas

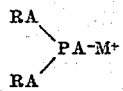

and

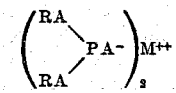

wherein R is a hydrocarbon radical of up to 14 carbon atoms, A is an atom of an element of group VI having an atomic weight below 40, and M is a metallic cation of groups I and II of the periodic table, and isolating from the resulting reaction product a phosphonoalkanesulfonate ester salt selected from the class consisting of the compounds of the formulas

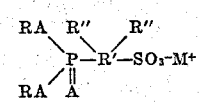

and

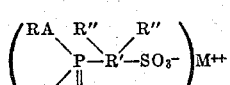

wherein R, R', R", A and M have the meaning described hereinabove.

12. The process which comprises reacting an alkanesultone of the formula

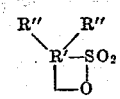

wherein R' is an alkylene radical of from 3 to 7 carbon atoms, and R" is selected from the class consisting of hydrogen and hydrocarbon radicals free of aliphatic unsaturation and containing from 1 to 12 carbon atoms, with a secondary ester of a phosphite salt selected from the class consisting of compounds of the formulas

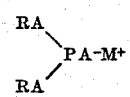

and

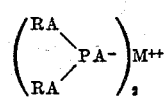

wherein R is a hydrocarbon radical of up to 14 carbon atoms, A is an atom of an element of group VI having an atomic weight below 40, and M is a metallic cation of groups I and II of the periodic table, and isolating from the resulting reaction product a phosphonoalkanesulfonate ester salt selected from the class consisting of compounds of the formulas

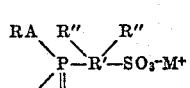

and

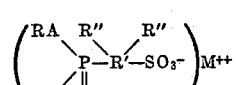

wherein R, R', R", A and M have the meaning described hereinabove.

13. The process which comprises reacting an alkanesultone of the formula

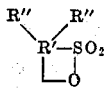

wherein R' is an alkylene radical of from 3 to 7 carbon atoms, and R" is selected from the class consisting of hydrogen and hydrocarbon radicals free of aliphatic unsaturation and containing from 1 to 12 carbon atoms, with a secondary ester of a phosphite salt selected from the class consisting of compounds of the formulas

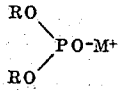

and

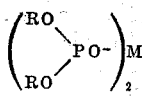

wherein R is a hydrocarbon radical of up to 14 carbon atoms and M is a metallic cation of groups I and II of the periodic table, and isolating from the resulting reaction product an ester salt selected from the class consisting of compounds of the formulas

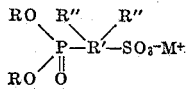

and

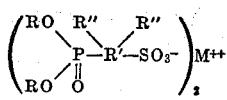

wherein R, R', R" and M have the meaning described hereinabove.

14. The process which comprises reacting an alkanesultone of the formula

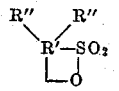

wherein R' is an alkylene radical of from 3 to 7 carbon atoms and R" is selected from the class consisting of hydrogen and hydrocarbon radicals free of aliphatic unsaturation and containing from 1 to 12 carbon atoms, with a secondary ester of a phosphite salt selected from the class consisting of compounds of the formulas

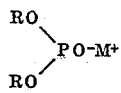

and

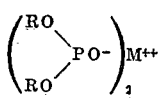

wherein R is a hydrocarbon radical of up to 14 carbon atoms, and M is a metallic cation selected from the class consisting of alkali metals and alkaline earth metals, and isolating from the resulting reaction product a compound selected from the class consisting of compounds of the formulas

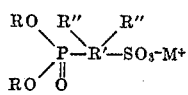

and

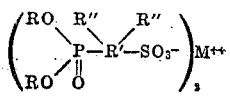

wherein R, R', R" and M have the meaning described hereinabove.

15. The process which comprises reacting an alkanesultone of the formula

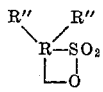

wherein R' is an alkylene radical of from 3 to 7 carbon atoms and R" is selected from the class consisting of hydrogen and hydrocarbon radicals free of aliphatic unsaturation and containing from 1 to 12 carbon atoms, with a secondary ester of a phosphite salt selected from the class consisting of the compounds of the formulas

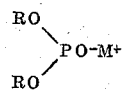

and

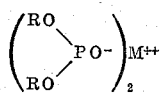

wherein R is an alkyl radical of up to 14 carbon atoms and M is a metallic cation selected from the class consisting of alkali metals and alkaline earth metals, and isolating from the resulting reaction product a compound selected from the class consisting of compounds of the formulas

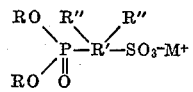

and

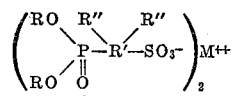

wherein R, R', R" and M have the meaning described hereinabove.

16. A method for the preparation of a compound of the formula

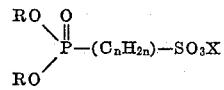

which comprises contacting at a temperature in the range of about 60° to 150° C. a compound of the formula

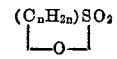

with one having the formula

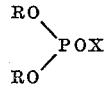

in the presence of a volatile inert organic solvent, in which R is an alkyl group of four to twelve carbon atoms, $n$ is an integer of three to four, and X is an alkali metal.

17. The process which comprises reacting γ-propanesultone with sodium dibutyl phosphite and isolating from the resulting reaction product sodium 3-(dibutoxyphosphono)-1-propanesulfonate.

18. The process which comprises reacting γ-propanesultone with sodium bis(2-butyloctyl) phosphite and isolating from the resulting reaction product sodium 3-[bis(2-butyloctoxy)phosphono]-1-propanesulfonate.

References Cited in the file of this patent

Kosolapoff: "Organo-Phosphorus Compounds," John Wiley & Sons, Inc., New York (1950), page 139.